June 12, 1934.   D. J. DOLAN ET AL   1,962,434
TEMPORARY ENGINE CONTROL
Filed Sept. 12, 1932   4 Sheets-Sheet 1

INVENTORS
David J. Dolan &
Frank R. Higley
BY
Brockett, Hyde, Higley & Meyer
ATTORNEYS June 12, 1934.  D. J. DOLAN ET AL  1,962,434
TEMPORARY ENGINE CONTROL
Filed Sept. 12, 1932    4 Sheets-Sheet 3

INVENTORS
David J. Dolan &
Frank R. Higley
BY Brockett, Hyde, Higley & Meyer
ATTORNEYS

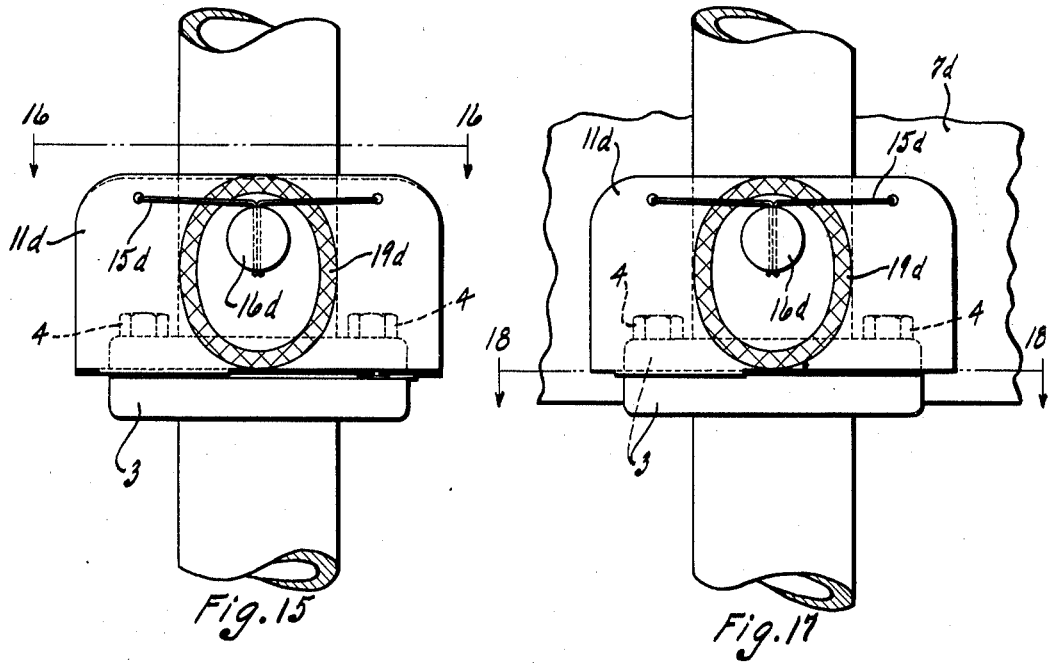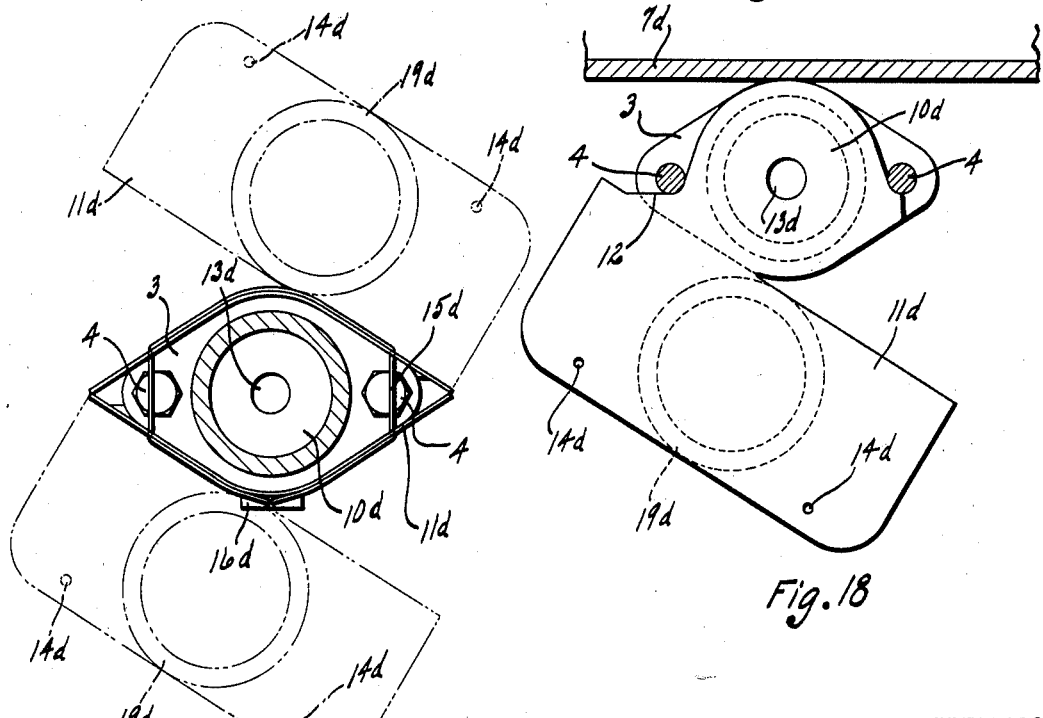

Patented June 12, 1934

1,962,434

UNITED STATES PATENT OFFICE 1,962,434

TEMPORARY ENGINE CONTROL

David J. Dolan and Frank R. Higley, Cleveland Heights, Ohio, assignors to The Cardel Company, Inc., Chester, Pa., a corporation of Delaware Application September 12, 1932, Serial No. 632,779

12 Claims. (Cl. 137—75)

This invention relates to protective devices for the fuel supply pipes of internal combustion engines and the like, whereby flow may be limited by means which may be sealed. Generally, the object of this invention is an improvement by way of simplification over that disclosed in the copending application of David J. Dolan, Serial No. 632,778, filed of even date herewith.

Figure 1:
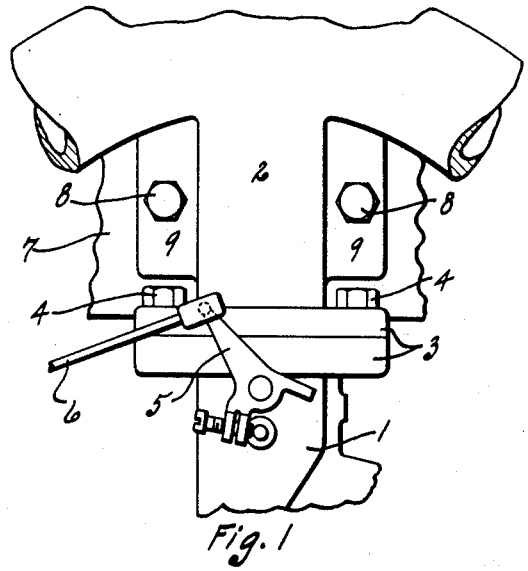
Figure 3:
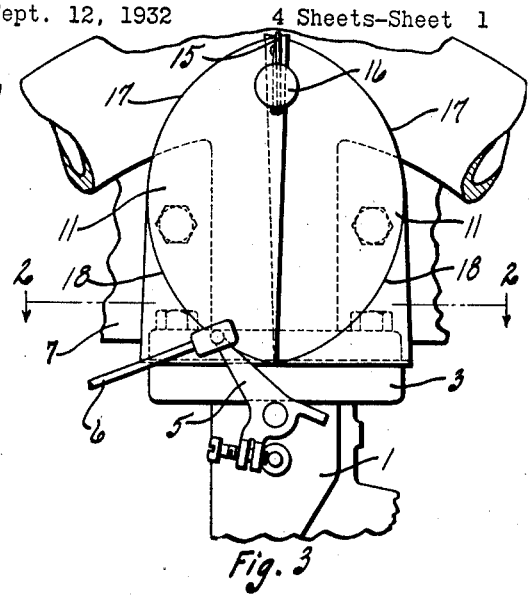
Figure 5:
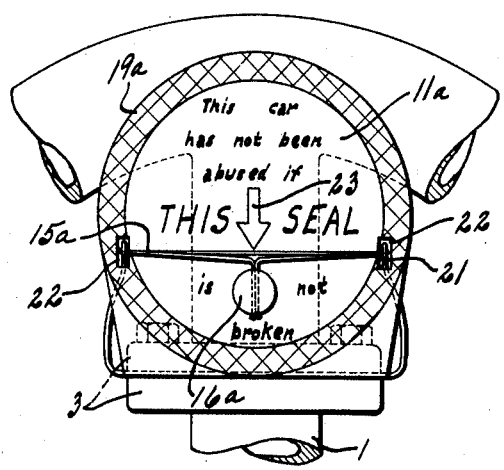
Figure 2:
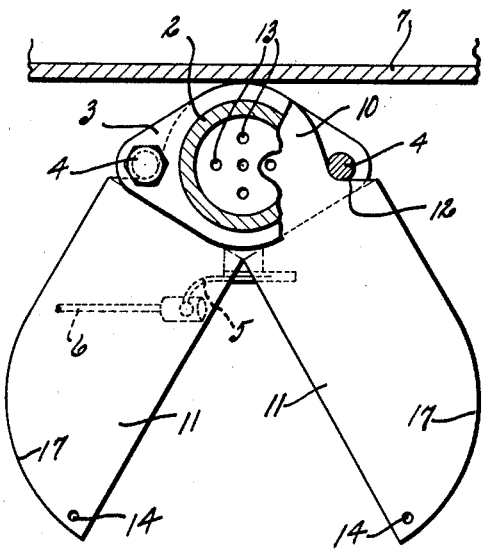
Figure 4:
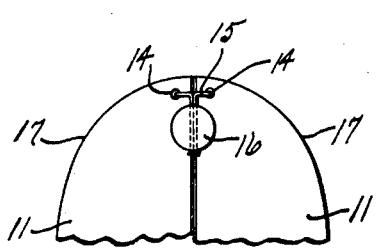
Figure 6:
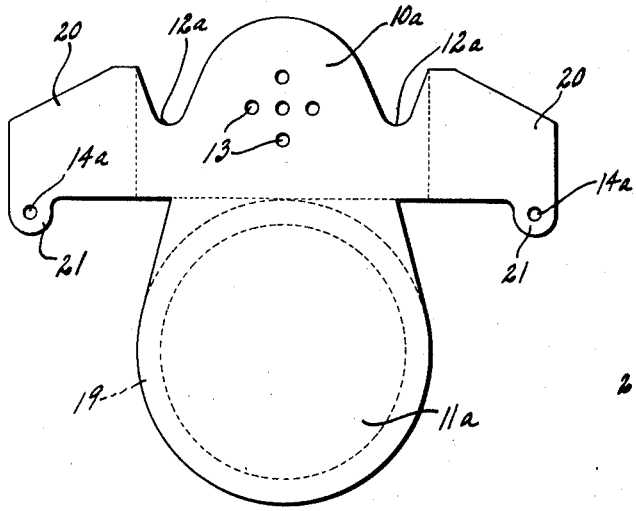
Figure 7:
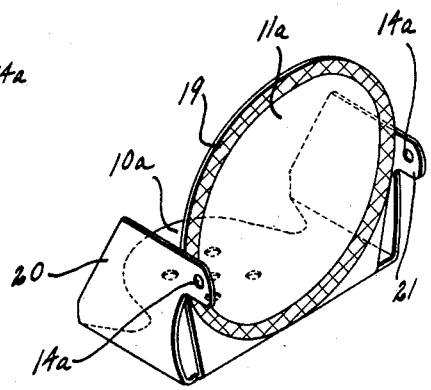
Figure 8:
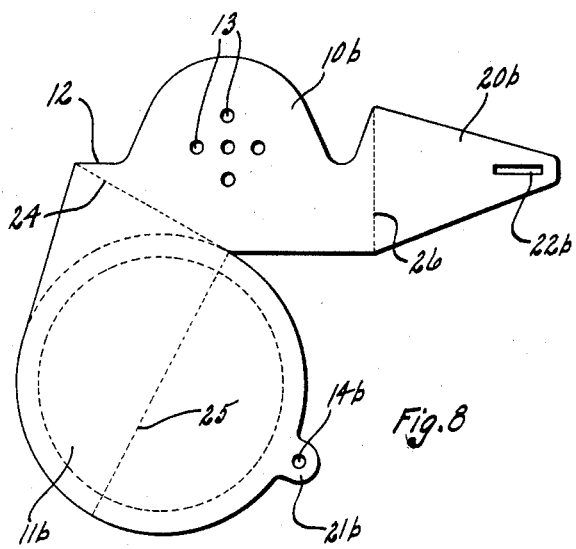
Figure 9:
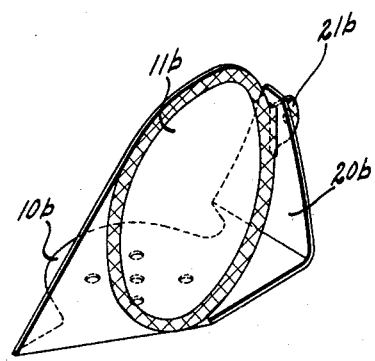
Figure 10:
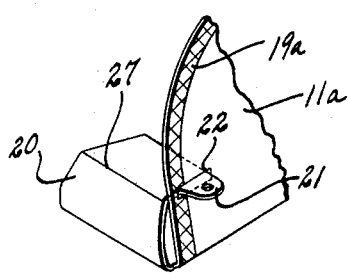
Figure 11:
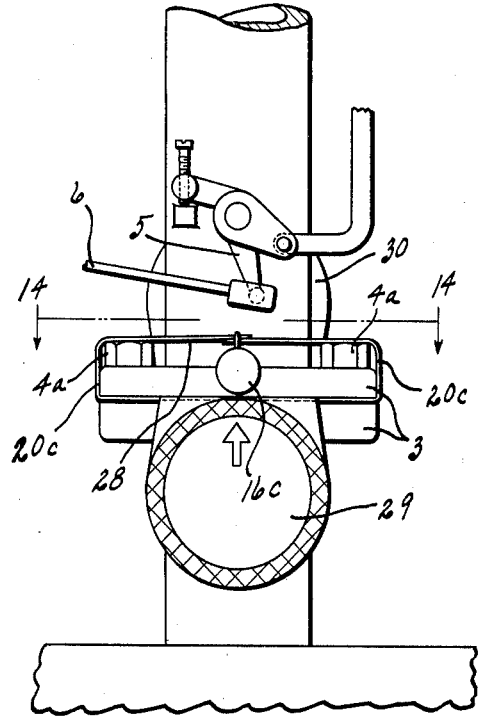
Figure 12:
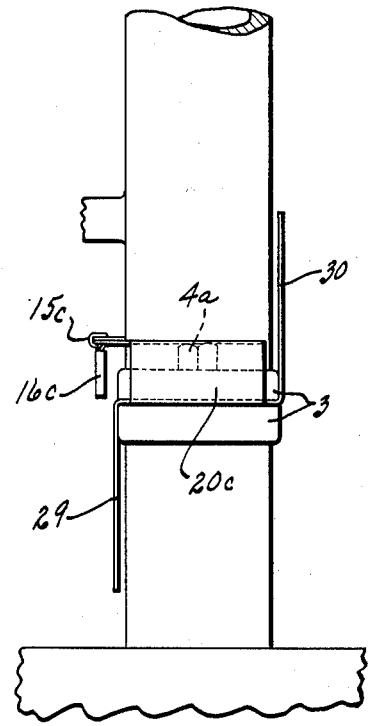
Figure 13:
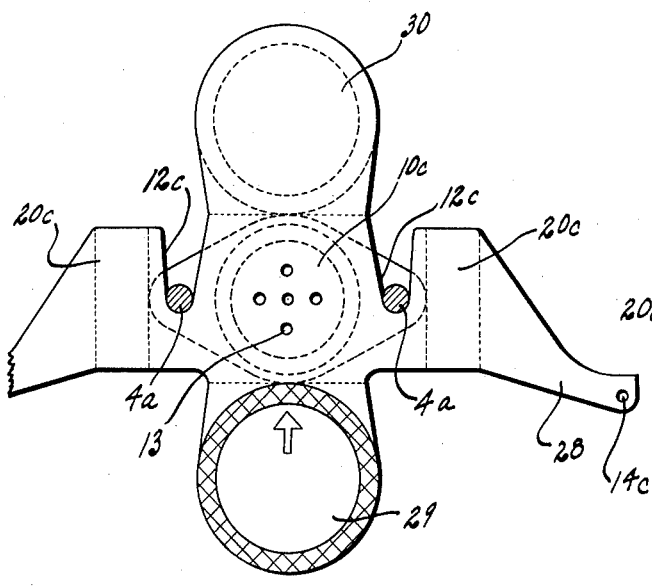
Figure 14:
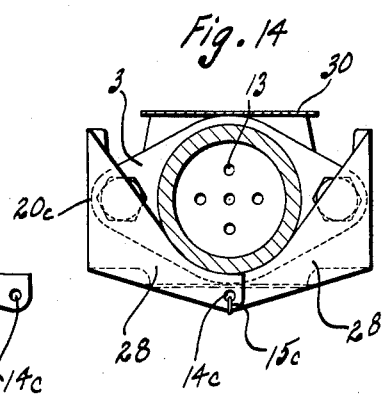

Further objects and advantages will be apparent from the following description taken in connection with the accompanying drawings in which Fig. 1 is a side elevation of pertinent parts of an automotive engine to be protected; Figs. 2 and 3 are horizontal section and elevation respectively of an embodiment of the device of this invention applied to the parts appearing in Fig. 1, the section of Fig. 2 being as in the plane of line 2—2, Fig. 3, but the protective device being shown in Fig. 2 as before bending to complete its application; Fig. 4 is a detail in elevation showing a slight modification of the arrangement shown in Fig. 3; Fig. 5 is a front elevation of another form of the device in sealed position; Fig. 6 shows in flat form, as a development, the modification of the form of device shown in Fig. 5; Fig. 7 is a perspective view illustrating the manner of bending the device of Fig. 6 when the latter is used; Figs. 8 and 9 are views corresponding with Figs. 6 and 7 but illustrating another modification; Fig. 10 illustrates a modification of the securing means of the form of Figs. 5 to 9 inclusive; Figs. 11 and 12 are front and side elevations showing another embodiment of the invention, in operative position on another form of engine; Fig. 13 illustrates the device of Figs. 11 and 12 as in position but before bending; Fig. 14 is a transverse section as in the plane of line 14—14, Fig. 11; Fig. 15 is a front elevation of another modification of the device in position; Fig. 16 is a section as in the plane of line 16—16, Fig. 15, illustrating in dot-dash lines the parts of the device before bending; Fig. 17 is a view corresponding to Fig. 16 showing the same form of device but applied to a different engine arrangement; and Fig. 18 is a section as in the line 18—18, Fig. 17.

With reference now to the drawings, Fig. 1 thereof shows a carburetor 1 and intake manifold 2 served thereby, these parts being secured together by a joint of bolted flange type including the flanges 3, one of each part, in registry and secured together by a pair of oppositely disposed bolts 4. The carburetor has the usual throttle control lever 5 actuated by a control rod 6. The intake manifold 2 is secured on the front face 7 of the engine which it serves, as by bolts 8 passing through flanges 9, so that the bolts 4 lie closely adjacent the engine wall 7.

It will be understood that the carburetor has a delivery opening controlled by the throttle and the manifold 2 has a conduit which takes delivery from the carburetor and distributes the carburetor output to the various cylinders of the engine. The carburetor being carried by the manifold through the described joint, it may be removed by removal of the bolts 4, which pass through openings in the manifold flange 3 and are screw threaded into openings in the carburetor flange 3, so that loosening of the bolts 4 will permit separation of the flanges 3.

With reference to Figs. 2 and 3, the control device is simply a piece of sheet material, of such qualities that it may be bent, and that part which will be exposed to the path of fuel flow of such nature that it will not deteriorate from contact with the fuel. Thus, sheet metal is a suitable materal.

The device has two essential elements, first a governor member 10 and secondly guard means such as the members 11, which may be permanently associated with the governor member and consequently are preferably integral therewith.

The governor member 10 is adapted to be inserted between the flanges 3, upon loosening of the bolts 4. It has associated parts such as the shoulders at 12 cooperative with the bolts 4 to position it in the joint. It is perforated as at 13 to permit flow of fuel, but restricted flow only, the perforations being so related with the positioning means that they will lie in the path of flow in the fuel passage when the device is seated against the bolts.

In operation, the bolts 4 being loosened, the device is inserted as indicated in Fig. 2, using the guard members 11 as handle means. The bolts 4 are next turned down to tighten the joint, securing the governor member 10 between the flanges 3. The guard members 11 are next bent upwardly along lines defined by the straight outlines of the upper flange 3, which operation brings the two guard members together in front of the heads of the bolts 4.

The guard members 11 are perforated at their extremities, as at 14, these perforations, as indicated in Fig. 3, being in registry after the bending operation. A wire 15 is threaded through the openings 14 and its ends sealed together as by a lead seal 16.

With the parts so positioned, the upstanding guard members 11 prevent loosening access to the heads of the bolts 4 from in front and at the sides, and access from the rear is prevented by the engine wall 7. The governor member 10 therefore remains effective until the seal is broken, the guard parts bent downwardly and the bolts 4 loosened. So long as the seal remains intact that is positive indication that the engine has not had sufficient fuel to over-speed it.

The outer edges of the guard members 11 have curvature as at 17, and this curvature is continued as by a line 18 printed or embossed upon the members, so that their faces which are presented forwardly, Fig. 3, display an approximation of an enlarged circular seal having convexity and which the actual seal 16 overlies, whereby the device is conspicuous, suggests a seal and calls attention to the seal 16. The face parts outlined by the lines 17 and 18 may be colored to attract attention.

Fig. 4 illustrates another arrangement of the wire 15 wherein the upper parts of the guard members 11 are brought together without overlapping, as shown in Fig. 3.

With reference now to the modification of Figs. 6 and 7, the governor member 10a has a single associated guard member 11a. The guard member has a circular outline and bears on its face a colored border 19 in the form of a complete circle simulating a seal. Auxiliary guard parts 20 are provided at the sides so that the notches 12a replace the shoulders 12 of the first described form. Tabs 21 perforated as at 14a are carried at the ends of the auxiliary guard parts 20.

In use the governor part 10a is inserted and properly positioned by the notches 12a and the bolts 4 tightened, as before. The guard member 11a and the guard parts 20 are next folded upwardly as indicated in Fig. 7, about the upper flange 3 of the manifold. The parts being properly proportioned, the openings 14a now lie on diametrically opposite sides and directly in front of the face of the guard member 11a. A wire is threaded in these openings directly across this face and sealed, the seal lying now substantially centrally of the circle 19. Here, as before, access to the bolts 4 from the front or the sides is prevented by the guard members of the protective device, which cannot be removed from their obstructed position without either breaking the seal or such bending operations as would leave them permanently so deformed as would permanently indicate tampering.

Fig. 5 shows a very slight modification of the form of device of Figs. 6 and 7. Here the guard member 11a is provided with openings 22 in the form of slots, to receive the tabs 21. Thus, in use, the guard members 20 are bent upwardly before the guard member 11a is, so that the latter when bent will move over the tabs 21, the latter projecting through openings 22. The seal wire 15a thus extends across only part of the face of the guard member 11a, as indicated in Fig. 5, to more firmly secure the guard parts in their guarding relation.

As indicated, Fig. 5, the face presented when the device is in position very well simulates an enlarged seal over which the actual seal 16a is superimposed, and the face is provided with a legend including the conspicuous arrow 23 calling unmistakable attention to the actual seal.

With reference now to the modification of Figs. 8 and 9, here the governor member 10b has an integrally associated guard member 11b on one side and a lateral extension 20b on the opposite side. The member 10b has a tab 21b perforated as at 14b, and the member 20b has an opening 22b.

When the governor member 10b of this form is properly secured, the guard member 11b is folded upwardly along a line 24 defined by one side of the upper flange 3 of the manifold, its part bearing the tab 21b is bent rearwardly approximately on the diametrical line 25, and the part 20b next bent upwardly along the line 26, the tab 21b being inserted into the opening 22b during the last operation. A simple seal arrangement with its wire extending through the opening 14b serves to secure and seal the parts so bent, which parts obviously prevent access to the bolts 4 as in the other arrangements.

Fig. 10 illustrates a slight modification obviously applicable to either the form of Fig. 5, Figs. 6 and 7, or Figs. 8 and 9. This modification differs from that of Fig. 5, for example, only in that the side guard members 20 are bent a second time, as at 27, so that they immediately overlie the bolts 4, the tabs 21 now being horizontally disposed and the openings 22 being correspondingly arranged.

With reference now to the modification of Figs. 11 to 14 inclusive, this is applicable where the joint is accessible from either side, an arrangement found in V engines.

Here, the protective device shown in flat form, Fig. 13, has joined to its governor member 10c a pair of laterally disposed guard members 20c. These members are formed as by the extensions 28 so that when the governor member 10 is secured at the joint as before, the members may be bent upwardly, thence together over the bolts 4 with their extremities overlapping, as indicated in Figs. 11, 12 and 14, where they are secured as by the wire 15c in perforations 14c, and seal 16c, thus preventing turning access to the bolt heads. A pair of oppositely disposed display members 29 and 30 are integrally associated with the governor member 10c, as indicated Fig. 13. The member 29 may be of any desired size but the member 30, on the side opposite the notches 12c, must be narrow enough to pass between the bolts 4a of the joint. Both members 29 and 30 are preferably of the circular outline indicated and may bear border and other marking simulating seals, as before. After this device is secured in place the member 29 is bent downwardly below the seal and the member 30 bent upwardly, as indicated in Figs. 11 and 12, so that on each side of the engine attention is drawn to its protected condition.

With reference now to the modification of Figs. 15 to 18, it comprises the usual governor member 10d and integrally associated guard member 11d laterally disposed as in the modification of Figs. 8 and 9, but wide enough that when bent to upstanding position, and around as indicated in Figs. 15 to 17, it will prevent access to the bolts from its side. The guard member 11d is provided with a pair of spaced openings 14d near its top and preferably bears upon its face a simulation of a circular seal, as indicated at 19d.

This form of the device may be employed whether or not the joint is made inaccessible from one side as by the engine wall 7d.

As may be seen from Figs. 17 and 18, where there is such engine wall, a single device is used, the wire 15d carrying the seal 16d is passed through the two openings 14d and around back of the manifold 2d.

As indicated in Figs. 15 and 16, where there is no adjacent engine wall 7d, two of the devices are employed, one inserted from either side of the joint, with the two governor members 10d thereof, with their openings 13d in registry and lying one above the other. Here the seal wire 15d passes around the manifold through all four of the openings 14d of the two guard members 11d securing the latter in upstanding position entirely surrounding the heads of the bolts. As indicated, Fig. 16, the wire stretches between the guard members serving to prevent access to the bolt heads from above.

What we claim is:

1. In an engine having a fuel supply pipe with a joint of bolted flange type, a protective device of sheet material comprising a governor member adapted to be inserted between the flanges of said joint and there secured by tightening of said joint, an integral guard member adapted to be thereafter disposed by bending adjacent the bolt heads to prevent loosening access thereto, and means for sealing said guard means so disposed.

2. In an engine having a fuel supply pipe with a joint of bolted flange type, a protective device of sheet material comprising a governor member adapted to be inserted between the flanges of said joint and there secured by tightening of said joint, a plurality of integrally associated guard members adapted to be thereafter disposed by bending, each adjacent one of the flange bolt heads, to prevent loosening access thereto, and sealing means for securing said guard members together when so disposed.

3. In an engine having a fuel supply pipe with a joint of bolted flange type, a protective device of sheet material comprising a governor member adapted to be inserted between the flanges of said joint and there secured by tightening of said joint, a pair of associated guard members adapted to be thereafter disposed by bending adjacent the bolt heads to prevent loosening access thereto, said guard members having cooperative interlocking means for maintaining their said position, and means for sealing said cooperative parts interlocked.

4. In an engine having a fuel supply pipe with a joint of bolted flange type, a protective device of sheet material comprising a perforated governor member adapted to be inserted between the flanges of said joint and there secured by tightening of said joint and having parts adapted to engage the flange bolts to properly position the member before its securement, permanently associated guard means adapted to serve as a handle for insertion of said governor member and to be thereafter disposed by bending adjacent the bolt heads to prevent loosening access thereto, and means for sealing said guard means so disposed.

5. In an engine having a fuel supply pipe with a joint of bolted flange type, a protective device of sheet material comprising a governor member adapted to be inserted between the flanges of said joint and there secured by tightening of said joint, a pair of oppositely arranged display members associated with said governor member to be thereafter disposed by bending, to present faces for display on opposite sides of said supply pipe, guard means adapted to be disposed by bending adjacent the bolt heads to prevent loosening access thereto, and means for sealing said guard means so disposed.

6. In an engine having a fuel supply pipe with a joint of bolted flange type, a protective device of sheet material comprising a governor member adapted to be inserted between the flanges of said joint and there secured by tightening of said joint, a pair of oppositely arranged integrally associated display members adapted to be thereafter disposed by bending to present faces for display on opposite sides of said supply pipe, integrally associated guard means adapted to be disposed by bending adjacent the bolt heads to prevent loosening access thereto, and means for sealing said guard means so disposed.

7. In an engine having a fuel supply pipe with a joint of flange type secured by a pair of oppositely disposed bolts, a protective device of sheet material comprising a governor member adapted to be inserted between the flanges of said joint and there secured by tightening of said bolts, a pair of display members oppositely associated with said governor member, one of said display members being adapted to pass between said bolts and the other having associated parts to engage said bolts to position said governor member, said display members being adapted to be thereafter disposed by bending to present faces for display on opposite sides of said supply pipe.

8. In an engine having a fuel supply pipe with a joint of flange type secured by a pair of oppositely disposed bolts, a protective device of sheet material comprising a governor member adapted to be inserted between the flanges of said joint and there secured by tightening of said bolts, a pair of display members oppositely associated with said governor member, one of said display members being adapted to pass between said bolts and the other having associated parts to engage said bolts to position said governor member, said display members being adapted to be thereafter disposed by bending to present faces for display on opposite sides of said supply pipe, associated guard means adapted to be disposed by bending adjacent the bolt heads to prevent loosening access thereto, and means for sealing said guard means so disposed.

9. In an engine having a fuel supply pipe with a joint of flange type secured by a pair of bolts and having its side parts oppositely exposed, a pair of protective devices of sheet material each comprising a governor member adapted to be inserted between the flanges of said joint and there secured by tightening of said joint and having associated parts cooperative with said bolts to position its governor member, each governor member having an associated guard member adapted to be thereafter disposed by bending adjacent the bolt heads to prevent loosening access thereto from the near side, and means for sealing together said guard means so disposed.

10. In an engine having a fuel supply pipe with a joint of bolted flange type, a protective device of sheet material comprising a governor member adapted to be inserted between the flanges of said joint and there secured by tightening of said joint, associated guard means adapted to be thereafter disposed by bending adjacent the bolt heads to prevent loosening access thereto, and means for sealing said guard means so disposed, said guard means being arranged to present for display, when in guarding position, a face simulating a seal.

11. In an engine having a fuel supply pipe with a joint having securing bolt means, a protective device comprising a governor member adapted to be inserted in said pipe at said joint and there secured by tightening of said bolt means, a guard member permanently secured with said governor member to serve as a handle therefor during said insertion, and to be disposed, by a bending operation after said tightening, adjacent the bolt means to prevent loosening access to the latter, and means for sealing said guard means so disposed.

12. In an engine having a fuel supply pipe with a joint having securing bolt means, a protective device comprising a governor member adapted to be inserted in said pipe at said joint and there secured by tightening of said bolt means, a guard member integral with said governor member and adapted to be disposed by bending adjacent the bolt means to prevent loosening access to the latter, and means for sealing said guard means so disposed.

DAVID J. DOLAN.
FRANK R. HIGLEY.